Nov. 29, 1927.
A. Y. DODGE
1,651,195
BRAKE APPLYING CONNECTION
Filed July 16, 1925
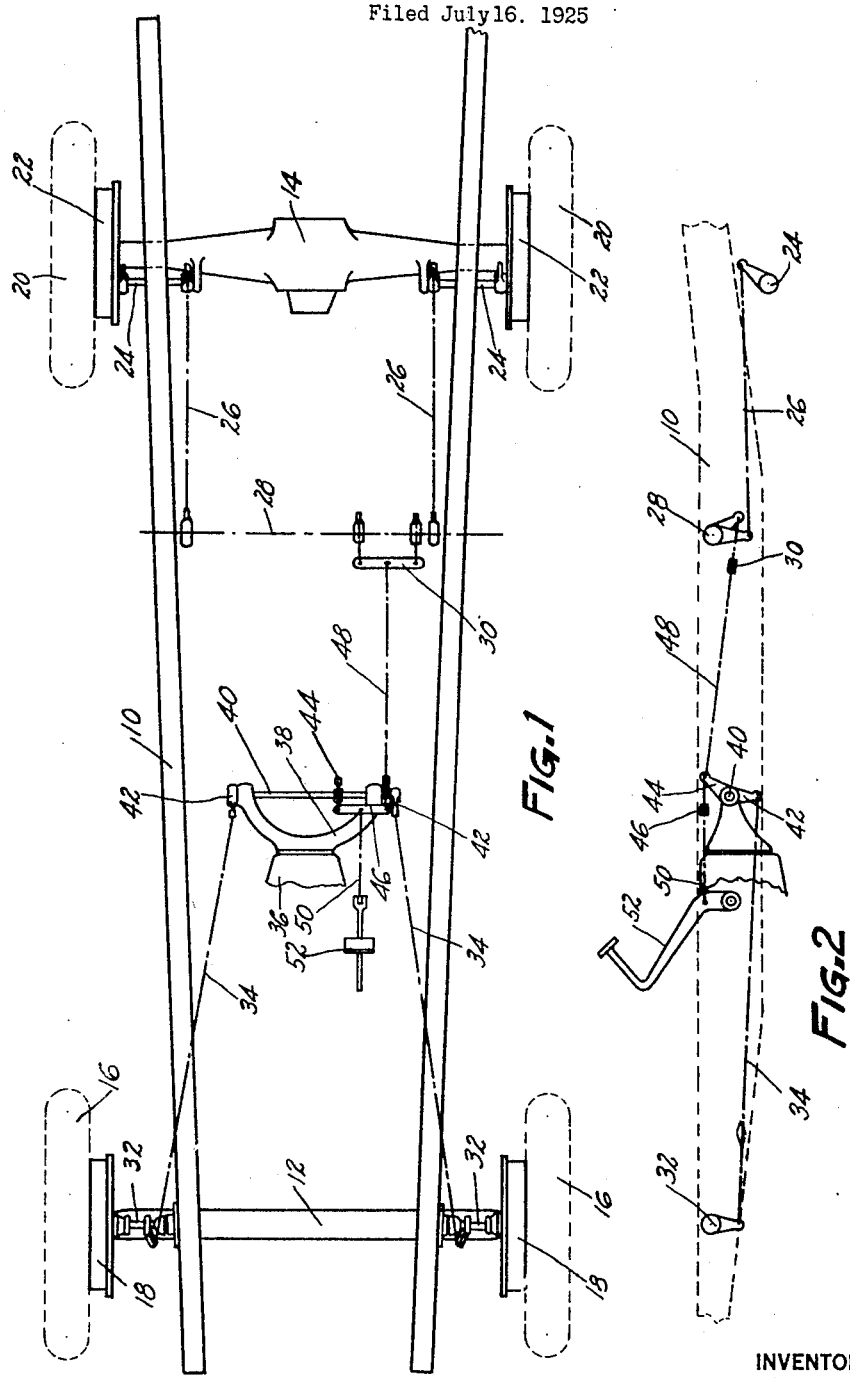
INVENTOR
ADIEL Y. DODGE
BY
*M. W. McConkey*
ATTORNEY Patented Nov. 29, 1927.

1,651,195

UNITED STATES PATENT OFFICE.

ADIEL Y. DODGE, OF SOUTH BEND, INDIANA.

BRAKE-APPLYING CONNECTION.

Application filed July 16, 1925. Serial No. 43,954.

This invention relates to brakes, and is illustrated as embodied in an automobile chassis. An object of the invention is to simplify the construction and arrangement of the operating connections, by the use of a bracket secured to the rear end of the transmission housing and having oppositely extending arms carrying a brake-applying shaft.

The above and other objects and features of the invention, including various novel combinations of parts and desirable particular constructions, will be apparent from the following description of one illustrative embodiment shown in the accompanying drawings, in which:

Fig. 1 is a top plan view of a chassis embodying the invention; and

Fig. 2 is a diagrammatic vertical section showing the connections.

In the arrangement selected for illustration, the invention is embodied in a chassis including a frame 10 supported by the usual springs (not shown) on front and rear axles 12 and 14. The front wheels 16 have brakes 18 and the rear wheels 20 have brakes 22. The rear brakes 22 are operated by shafts 24 connected by cables or rods 26 to a two-part rockshaft 28, the parts of which are connected by an equalizer 30. The front brakes 18 are operated by Perrot controls 32 connected to cables or rods 34. The above-described parts or their equivalents, except as further described below, may be of any desired construction.

According to the present invention, there is secured to the rear end of the transmission housing 36 a bracket 38 having outwardly-extending opposite arms straddling the propeller shaft (not shown). These arms support a transverse rockshaft 40, having at its opposite ends downwardly-extending arms 42 connected to the cables or rods 34 operating the front brakes 18. Shaft 40 crosses above the propeller shaft.

Between the arms of bracket 38, shaft 40 has an upwardly-extending arm 44, connected directly or by a short link to one end of a horizontal equalizer 46, which at its opposite end is connected by a rod or cable 48 to the center of the equalizer 30. At its center, or if desired somewhat at one side of its center to distribute unequally the force to front and rear brakes, equalizer 46 is connected by a rod or link 50 to the service pedal 52, or to an equivalent operating member.

While one illustrative embodiment of the invention has been described in detail, it is not my intention to limit its scope to that particular embodiment, or otherwise than by the terms of the appended claims.

I claim:

1. A vehicle having front and rear brakes and a transmission housing, and comprising, in combination therewith, a bracket secured to the rear end of said housing and provided with a pair of correspondingly, rearwardly, laterally outspread arms, a shaft supported by said arms, connections from the ends of the shaft to the brakes at one end of the vehicle, an arm on the shaft, an equalizer connected at one end to said arm and extending generally parallel to the shaft and provided with a connection extending from its opposite end to the brakes at the other end of the vehicle, and an operating lever connected to an intermediate part of the equalizer.

2. A vehicle having front and rear brakes and a transmission housing, and comprising, in combination therewith, a bracket secured to the rear end of said housing and provided with a pair of correspondingly, rearwardly, laterally outspread arms, a shaft supported by said arms and extending beyond each arm, arms on the shaft beyond the bracket arms, connections from said arms to certain of said brakes, an arm on the shaft between the two bracket arms, an equalizer connected at one end to said last mentioned arm, said equalizer extending parallel to the shaft beyond one of said bracket arms, a connection from the outer end of said equalizer to certain of said brakes, and an operating lever connected to said equalizer.

In testimony whereof I have hereunto signed my name.

ADIEL Y. DODGE.